(12) United States Patent
Halford

(10) Patent No.: US 9,987,806 B2
(45) Date of Patent: Jun. 5, 2018

(54) TOOL

(75) Inventor: Ben Halford, Rutland (GB)

(73) Assignee: SURFACE GENERATION LIMITED, Rutland (GB)

( * ) Notice: Subject to any disclaimer, the term of this patent is extended or adjusted under 35 U.S.C. 154(b) by 346 days.

(21) Appl. No.: 14/236,219

(22) PCT Filed: Aug. 7, 2012

(86) PCT No.: PCT/GB2012/051915
§ 371 (c)(1),
(2), (4) Date: Jul. 23, 2014

(87) PCT Pub. No.: WO2013/021194
PCT Pub. Date: Feb. 14, 2013

(65) Prior Publication Data
US 2014/0360653 A1    Dec. 11, 2014

(30) Foreign Application Priority Data

Aug. 8, 2011   (GB) .................................. 1113656.1

(51) Int. Cl.
*B29C 70/32*   (2006.01)
*B29C 53/82*   (2006.01)

(52) U.S. Cl.
CPC .............. *B29C 70/32* (2013.01); *B29C 53/82* (2013.01)

(58) Field of Classification Search
CPC .............. B29C 43/46; B29C 2043/461; B29C 2043/462; B29C 2043/463; B29C 2043/522; B29C 2043/527; B65B 9/023; C12Q 1/6806; C12Q 2521/101; Y10T 156/1741; B32B 37/182; B32B 38/0008; B32B 37/0038; B32B 37/1027; B01L 7/52

See application file for complete search history.

(56) References Cited

U.S. PATENT DOCUMENTS 4,749,023 A * 6/1988 Draper ............... B22D 11/0682
164/429
2002/0146478 A1   10/2002 Karbach

FOREIGN PATENT DOCUMENTS

| EP | 0897751 A1 | 2/1999 |
|---|---|---|
| GB | 761337 A | 11/1956 |
| GB | 979584 A | 1/1965 |
| JP | 2006224417 A | 8/2006 |
| SU | 1776228 A3 | 11/1990 |
| WO | 2009127399 A1 | 10/2009 |

OTHER PUBLICATIONS

Machine translation of JP 2006-224417.*
International Search Report of Feb. 14, 2013 in related PCT application PCT/GB2012/051915.
Written Opinion of the International Searching Authority in related PCT application PCT/GB2012/051915.
GB Search Report Under Section 17 dated Dec. 8, 2011 in related application GB1113656.1.

* cited by examiner

*Primary Examiner* — Vishal I Patel
(74) *Attorney, Agent, or Firm* — Young Law Firm, P.C.

(57) ABSTRACT

A tool (2, 102, 202) is constructed from a plurality of tessellating elements (34, 134, 234) to form a mandrel for the deposition of composite fibers.

13 Claims, 4 Drawing Sheets

TOOL

This invention relates to tools for manufacturing, in particular it relates to tools suitable for use in filament winding processes.

Filament winding machines are well known in the art and essentially comprise a central tool in the form of as mandrel onto which as resin coated filament of a reinforcing fibre is wound to build up a layer of material. The material is then exposed to an elevated temperature for the resin to cure.

A problem with existing winding machines is that they must be constructed for each individual shape of workpiece which is to be produced. For low and medium part volumes this can result in significant tooling costs.

A further problem with such machines is that they can only be used at a uniform temperature (usually determined by the environmental conditions in which the mandrel is placed, e.g. an autoclave). It would be beneficial to achieve greater control over the tool, and hence the workpiece temperature.

It is an aim of the present invention to provide an improved tool for use in a filament winding operation.

According to a first aspect of the invention there is provided a. tool assembly for forming a product, the tool assembly comprising:

a tool forming an endless loop in cross-section, the tool having a tool face and a control surface opposite the tool face, a plurality of independently controllable temperature control zones, each comprising heating and/or cooling means arranged to influence the temperature of the tool face.

Advantageously, the cure of material deposited onto the tool (e.g. a mandrel) can be easily controlled.

Preferably the heating and or cooling means are arranged to influence the temperature of the tool face by heating and/or cooling the control surface.

Preferably each heating and/or cooling means comprises a fluid chamber at least partially bounded by the control surface. Alternatively, heating means may be provided in the form of heating mats, e.g. electrical mats, or fluid based heating/cooling mats.

Preferably the heating and/or cooling means comprises a fluid outlet into the fluid chamber. This may be, for example, and inline air heater whose heating element can be switched off to provide cooling (by introduction of air at ambient temperature).

Preferably the fluid outlet is directed towards the control surface.

The tool may be unitary. Alternatively the tool comprises a plurality of radially mounted tool elements that substantially tessellate to form a continuous tool surface.

According to a second aspect of the invention there is provided a tool for forming a product, the tool comprising: a plurality of radially mounted tool elements that substantially tessellate to form a continuous tool surface.

Advantageously, the provision of the plurality of individual elements allows reconfiguration into different shapes.

The provision of a plurality of elements also facilitates the use of individual element control to dynamically control and vary the characteristics (e.g. temperature) of the surface.

Preferably the tool surface forms an endless loop in cross section, allowing use as a mandrel for the winding of filament materials used to form a workpiece.

Preferably the tool is mounted for rotation about a pivot axis. This allows a filament to be wound onto the tool to form a workpiece.

The tool surface may be radially outwardly facing, or radially inwardly facing. The tool may be supported by a support structure, supporting the tool element proximate its periphery. Preferably the support structure comprises a plurality of support members contacting discrete points around the periphery of the tool element.

The support structure may comprise a plate structure defining a volume at least partially bounded by a surface of the tool element. This allows fluid temperature control of each tool element. Preferably the volume comprises a fluid inlet and a fluid outlet. Preferably the tool comprises a plurality of tool element hubs upon which the tool elements are mounted, the tool element hubs being axially aligned on, or stacked along, the pivot axis. Alternatively the tool may comprise a single cylindrical tool element hub extending along the pivot axis.

The tool may have clamping means for axially clamping at least one of the tool element hubs and or the tool elements, from either axial end of the tool. An end bolster may be provided at either axial end of the tool. The clamping means are arranged to force the bolsters towards one another thereby damping said one of the tool element hubs and the tool elements between said bolsters.

In one preferred embodiment each tool hub has a plurality of spokes extending therefrom, each tool element mounted on a spoke. The tool elements may be radially adjustable in relation to the tool element hub. Preferably a central pivot bar is provided and extends along the pivot axis. The tool element hubs are mounted on the pivot bar. The central pivot bar and said tool element hubs can have corresponding location features thereon to prevent rotation of said tool element hubs relative to the pivot axis, for example keys with associated keyways or splines. Alternatively the central pivot bar may comprise a flat in cross section, or may be polygonal in cross section. In this manner rotation of the pivot, axis causes rotation of the tool surface.

The tool elements are preferably substantially rectangular in cross section. In one preferred arrangement the tool elements are orientated such that, in the clamped position. the sides of the cross section are substantially at 45 degrees to the pivot axis.

Each element may comprise an elongate tool pin, which can be tapered along its length. At least some of the tool elements may have heating and/or cooling means associated therewith to locally heat or cool the tool surface and/or a heating and/or cooling means adjacent but spaced from the tool surface and surrounding at least a part of the tool surface. Preferably the tool comprises temperature sensors for detecting the temperature of the tool surface. The individual tool elements may be welded to one another at the tool surface. Optionally the tool surface has had a finishing operation applied to it, such as a cutting or grinding operation. Means may be provided for feeding at least one filament of product material onto the tool surface to form a product. The means for feeding at least one filament of product material may be provided on a carriage that moves parallel to the pivot axis of the tool. The means for feeding may also rotate relative to the tool, allowing the tool to be stationary. This may be beneficial for larger tools where a significant amount of services need to be installed (e.g., heating, cooling, sensing services).

According to a third aspect of the invention there is provided a method of manufacturing a product comprising the steps of:

providing a tool forming an endless loop in cross-section, the tool having a tool face and a control surface opposite the tool face, depositing a material onto the tool face to form the product, independently controlling a plurality of temperature control zones, each comprising heating and/or cooling means arranged to influence the temperature of the tool face.

According to a fourth aspect of the invention there is provided a method of manufacturing a product comprising the steps of:

assembling a plurality of tessellating tool elements to form a continuous surface, depositing a material onto the continuous surface to form the product.

Preferably the continuous surface forms an endless loop in cross section, and in which the continuous surface is rotated about an axis passing through the endless loop. Preferably the method further comprises the step of heating the continuous surface to cure the material.

Specific embodiments of the invention will now be described, by way of example only, with reference to the following drawings in which.

Figure 1:
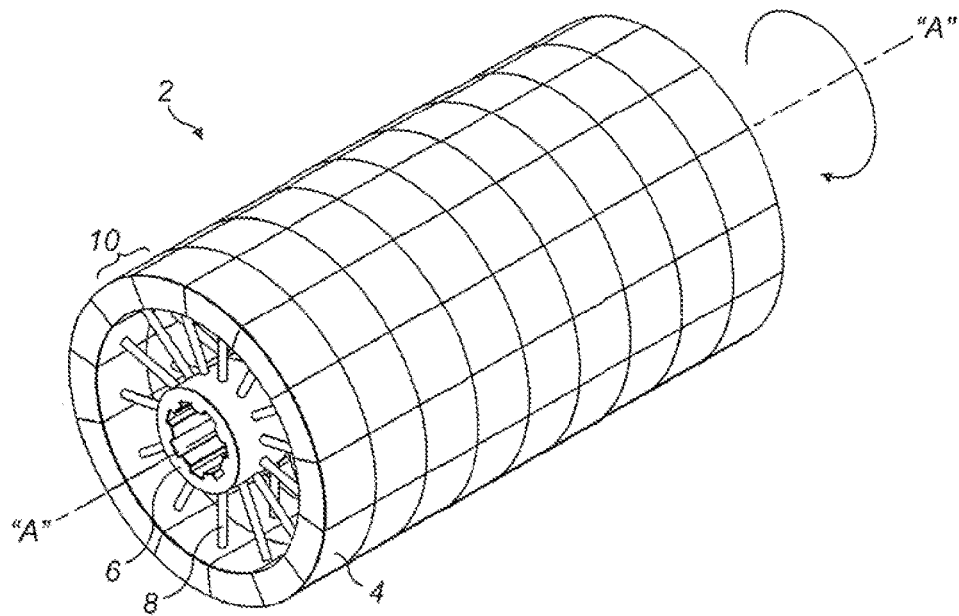
FIG. 1 shows a perspective view of a first tool according to the invention, having orthogonally arranged tool pins.
Figure 2:
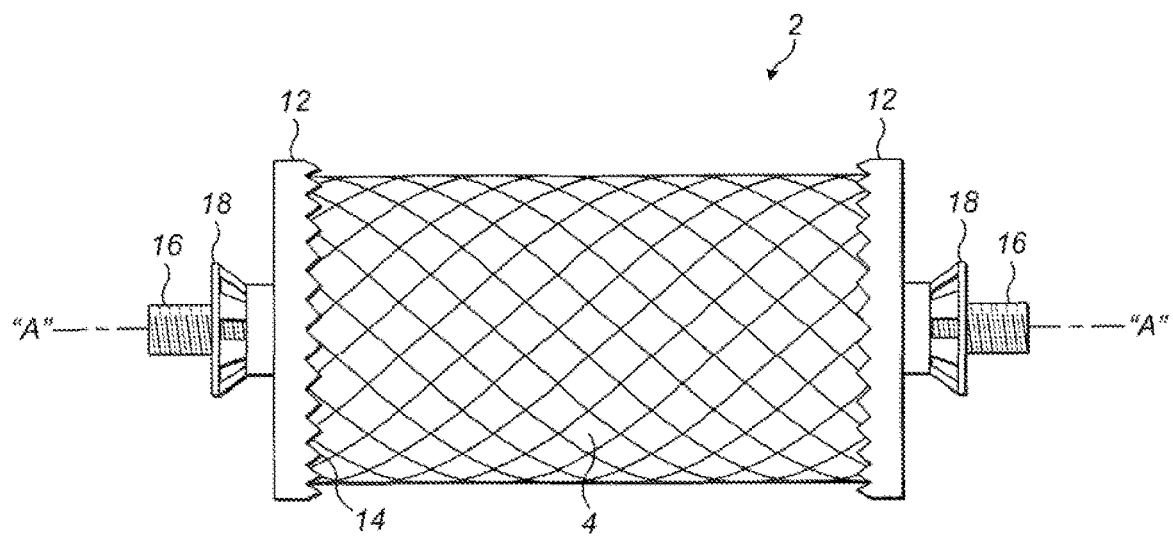
FIG. 2 shows a front view of a second tool according to the invention, having offset tool pins.
Figure 3:
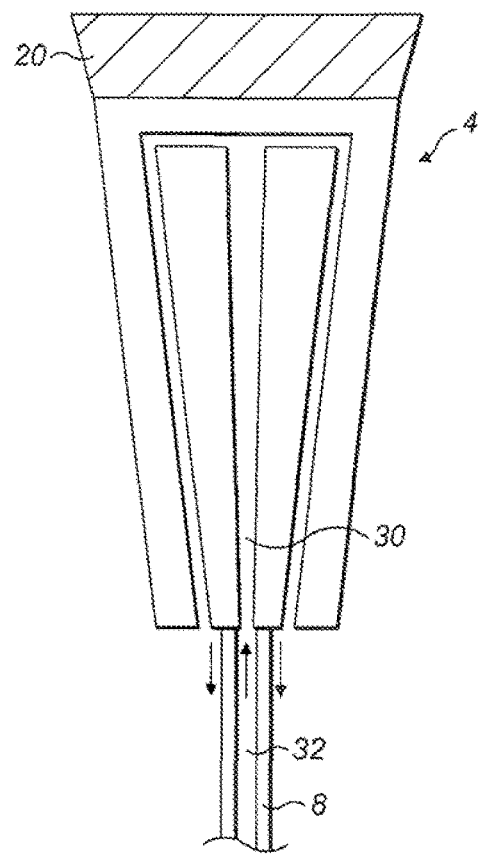
FIG. 3 shows a tool pin of the tool of FIG. 1.
Figure 4:
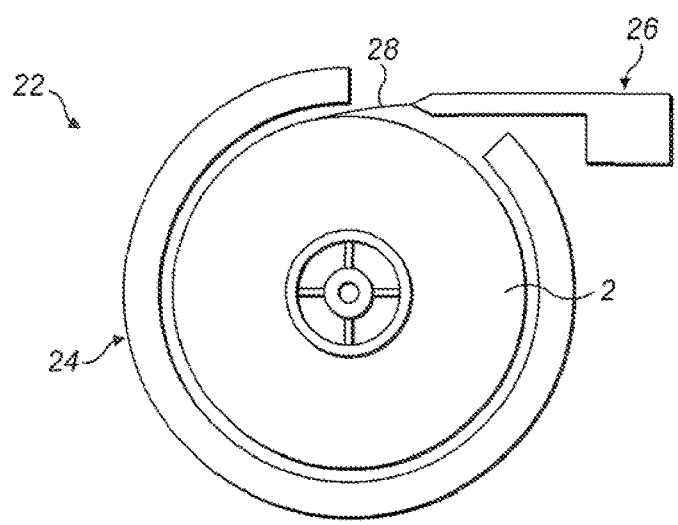
Figure 5:
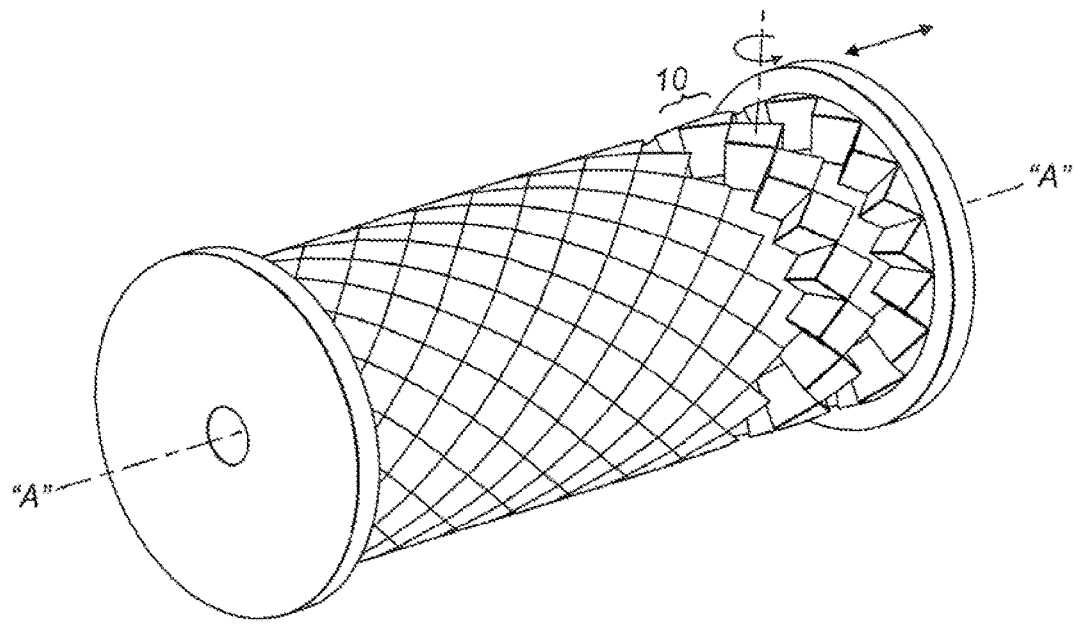
Figure 6:
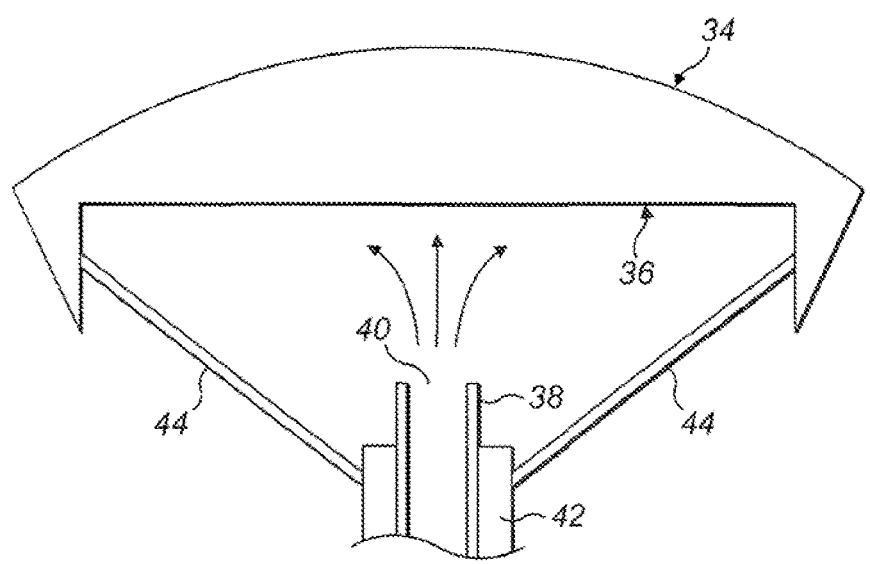
Figure 7:
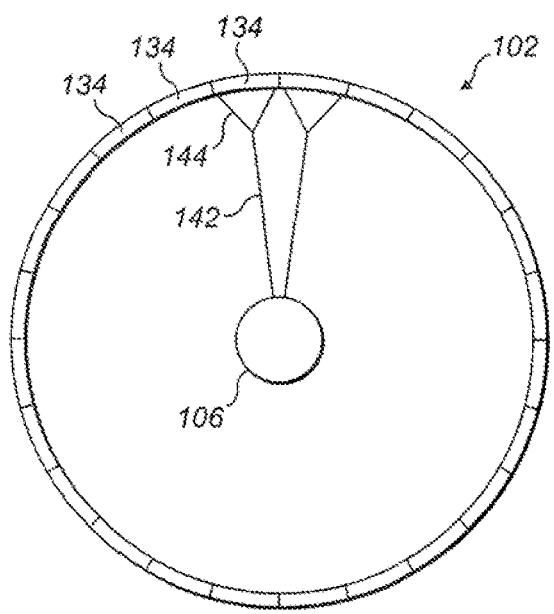
Figure 8:
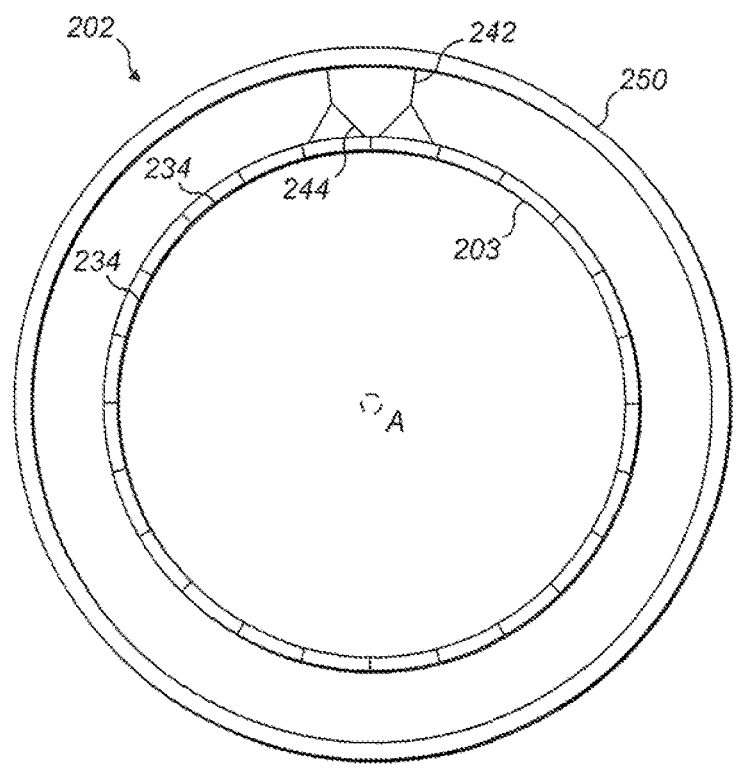

FIG. 4. shows a side view of a third tool in accordance with the invention;

FIG. 5 shows the tool of FIG. 2 in an open position to allow the pin positions to be changed;

FIG. 6 shows an alternative tool element to that shown in FIG. 3,

FIG. 7 is a schematic side view of a fourth tool according to the present invention comprising the tool elements of FIG. 6;

FIG. 8 is a schematic side view of a fifth tool according to the present invention;

Referring to FIG. 1 a tool 2 is shown which comprises a plurality of tool elements 4 that tessellate to form a continuous tool surface. The tool surface is substantially cylindrical in shape and is arranged about a central pivot axis "A"-"A", about which the tool 2 rotates. In use a filament, for example a glass, carbon, or other fibre filament, surrounded by a resin can be wound onto the outwardly facing tool surface formed by the tessellating tool elements 4 as the tool 2 rotates. The fibre filaments all become joined to one another as the resin surrounding them comes into contact with the resin of adjacent turns of the fibre elements and cures, thereby forming a product.

The tool elements 4 are each mounted upon a tool element hub 6 by means of a spoke 8. The tool element hubs each contain a plurality of radial spokes extending therefrom terminating in a tool element 4 thereby forming a wheel-like section 10 of the tool 2.

A plurality of the wheel-like sections 10 are arranged adjacent one another along the tool axis "A"-"A" so as to form the continuous tool surface. Although shown aligned so as to form a regular array with tool elements on adjacent tool element hubs aligned with one another it will be appreciated that adjacent tool element hubs may be offset from one another by a fraction of a tool element, e.g. by half of a tool element, so that elements on adjacent tool element hubs are not aligned with one another in the direction of the tool axis. This increases the strength of the tool.

The tool element hubs 6 are provided with interlocking features, omitted for clarity, so as to prevent the rotational movement of one wheel-like tool section 10 relative to the next. In this manner the array of wheel like sections 10 is connected.

The tool element hubs 6 are arranged on a central pivot bar (16, FIG. 2) such that rotation of the central pivot bar causes the continuous tool surface to rotate about the axis "A"-"A". The external surface of the pivot bar and the internal surface of the tool element hubs 6 may be keyed so that the rotational movement of the pivot bar translates into the tool element hubs 6, and therefore the tool elements 4 causing the continuous tool surface to rotate. Alternatively, to give the same effect, the pivot bar may be polygonal in cross section and the interior of the tool element hubs may be correspondingly shaped.

Referring now to FIG. 2 an alternative embodiment of the tool 2 is shown. In the arrangement shown in FIG. 2 the tool elements 4 are rotated 45° compared to those shown in FIG. 1 so that the sides of the tool element 4 are at an angle of approximately 45° to the pivot axis "A"-"A". In other respects the tool 2 has the same construction as shown in FIG. 1.

The tool 2 is further provided with a clamping means which comprises an end bolster 12 at either end of the continuous tool surface. The end bolsters 12 have a contoured inner surface 14 abutting the tool elements 4 so as to maintain them in their required angular orientation.

The central pivot bar 16 is provided with a thread at either end and clamps are tightened on the threaded ends of the pivot bar 16 so as to apply pressure, via the end bolsters 12, on the array of tool elements 4. It will be noted that the bolsters 12 also apply an axially compressive clamping force to the hubs 6 to keep them in position.

As will be appreciated, other clamping methods may be used to apply axial pressure from both ends on the tool surface.

Referring now to FIG. 3 a cross-section through a tool element 4 is shown. The tool elements 4 are substantially rectangular in cross-section (in the horizontal plane perpendicular to the page) and are tapered along their length to be wider at their radial outer surfaces.

Each tool element 4 has a sacrificial area of material 20 at its outer end. The pins 4 are adjustable inwards and outwards (i.e. radially) from the spokes 8 to form the desired shape of the tool surface.

Once the approximate tool surface shape is formed a finishing cut may be applied over the outwardly facing tool surface thereby removing part of the sacrificial layer 20 and ensuring that a continuous tool surface devoid of any inconsistencies between one tool element 4 and an adjacent tool element 4 are avoided.

At least some of the tool elements 4 may be provided with a tool element heating and/or cooling means by which at least some of the individual tool elements can be heated or cooled. The heating/cooling means may, as shown, include a fluid path 30 through the tool element 4 through which a heat transfer fluid can be carried, the heat transfer fluid having a temperature higher than that of the tool element if it is required to heat the tool element and a temperature lower than that of the tool element if it is required to cool the tool element. In one embodiment the spokes 8 may also have a central heating and/or cooling fluid channel 32 therein to carry the heat transfer fluid to the individual tool element. Separate channels may be provided, not shown, to carry the heat transfer fluid exiting the pins away. Alternatively, the exhausted transfer fluid could simply vent into the central area of the tool 2 and be extracted therefrom.

Referring now to FIG. 4 a moulding apparatus 22 is shown comprising three main parts: the tool 2, an outer heater 24 and a means 26 for feeding a filament 28 of product material onto the tool 2.

In operation as the tool 2 rotates about its central axis the filament 28 of product material is fed onto the tool surface by feeding means 26. Feeding means 26 comprises a feeder carriage that can move in a direction parallel to the pivot axis "A"-"A" of the tool. As the carriage moves parallel to the pivot axis of the tool the filament 28 is wound onto the tool surface to substantially cover it. The speed of movement of the carriage relative to the speed of rotation of the tool will determine the angle at which the filament 28 is wound upon the tool surface. The angle of winding may increase or decrease by changing the speed at which the carriage moves. In this way the angular alignment of the filament forming the product can be changed so as to modify the structural properties of the finished product.

The outer heater 24 can be used to heat or cool the product formed on the tool surface, and forms a heating element that substantially surrounds the tool surface. Sensors, not shown, may be embedded within the tool elements 4 or alternatively may be integrated into the product as it is made. Electrical signals from the temperature sensors can be fed back to a controller to control the temperature of one or both of the tool elements themselves and the heater 24 so as to closely regulate the temperature of the work piece upon the tool surface. In this way the parts can be cured on the tool without the need for locating a tool or placing a tool, into, for example, an autoclave.

Referring now to FIG. 5, the tool 2 of the invention is shown in an open state. When the end bolsters 12 are undamped the tool may separate axially along its pivot axis "A"-"A" so that the individual wheel-like sections 10 of the tool can he separated from one another. When the sections 10 are separated from one another the tool elements 4 can be adjusted on their spokes so as to move them radially towards, or away from, the centre of the tool element hubs. When the tool 2 is in its open position, as shown, the wheel-like sections of tool elements can be isolated so that they have space on either side thereof. When in this position, as, in the 45° arrangement, only the apexes of the tool elements touch one another. The elements can be rotated so as to change their position.

Although, as stated above, the tooling of this invention is primarily used to make cylindrical or almost cylindrical shapes, the actual shape of the tool surface can be modified by moving the individual tool pins in and out so that a non-symmetrical, non-uniform or otherwise customized shape can be produced. Once the tool elements 4 have been adjusted to their desired lengths the tool can be closed and the bolsters 12 can reapply the clamping force to the tool. Once the tool is clamped the lines joining the tool elements 4 may be welded so as to ensure a continuous metal tool surface. Furthermore, the outer surface of the tool is preferably machined with a sculpting and/or finishing cut so as to remove any discrepancies in the surface.

Once the finishing cut has been applied the tool surface will then be at its required dimensions.

Optionally, in a tool where at least some of the tooling pins are heated the finishing cut may be applied when the tool is at a specific predetermined temperature, for example 70°, and thereafter is allowed to cool down. In this example, when the tool is desired to be used it is initially heated up to the temperature at which the finishing cut was applied so that the shape of the work piece is as fully expected and so that potential sizing problems resulting from the thermal expansion/contraction of the tool material is avoided.

There is a further advantage that, where the moulding is commenced at a slightly elevated temperature, once the moulding process is complete and the resin is set, the tool surface can be cooled so as to make it contract and shrink away from the product, thereby enabling its simple release.

Referring to FIG. 6 an alternative tool element detail is shown. As the tool elements have a curved outer surface 34 and, as for ease of machining it is simpler to manufacture a tool element with a flat inner end surface 36, the material thickness of the end of the tool element is greater towards its centre and less towards its edges. If even heating is applied to the inside surface 36 of the end of the tool element the outer edges of the outside surface 34 of the tool element will rise in temperature more quickly that the centre of the tool element due to their lower thermal mass. The element therefore has a heating fluid inlet 38 that is comprises an opening 40 that directs heating and/or cooling fluid at the centre of the flat inner end surface 36. As the heating/cooling fluid impinges on the tool element at the thickest point of the inner end surface more heat is transferred into the area with the higher thermal mass. In this way a substantially constant heating of the outer surface 34 of the end of the tool element, and therefore the tool surface, can be achieved. The position of the opening 40 in relation to the inner end surface 36 of the tool element, in particular its spacing therefrom, the size of the opening and the velocity of the heating/cooling, fluid can be varied depending on the particular geometries of the tool element so as to achieve substantially constant cooling.

The element of FIG. 6 has walls 44 which extend from the inside surface 36 to a spoke 42 defining the opening 40. A chamber is thereby formed bounded in part by the inside surface 36.

The walls 14 are non load bearing but are supported by a number of support members (not shown) extending from the spoke 42 to the inside surface 36. The support members contact the element at its edges (specifically each of its four comers) and transfer the axial load from the tool surface 34 to the spoke 42. The provision of a support structure which supports the tool element proximate its periphery is advantageous because it allows even contact of the hearing fluid with the inside surface 36 whilst providing a stable platform to react the incident loads from the winding operation.

In particular the frame-like structure comprising a series of panels or plates defining the fluid space, being supported by a plurality of support members, is lightweight thus reducing the moment of inertia of the complete tool (and therefore making it easier to rotate compared to, say, a tool made up from the elements of FIG. 3).

Turning to FIG. 7, a side view of a tool 102 is shown being similar to the tool 2. The tool 102 comprises a plurality of tool elements 134 which are similar to the elements 34 each having connectors 144 similar to connectors 14. Each element 134 is connected to a spoke 142 which is in trim connected to a hub 106 as discussed in the embodiments described above.

As shown in FIG. 7, the tool elements 134 do not have a sacrificial portion, and instead are made relatively thin in order for a heating/cooling system (not shown) at the inner surface of the elements to easily influence the surface temperature of the tool element with minimum delay. The outer surface of the tool 102 is thereby made as responsive as possible to heating and cooling. This provides the user with improved control over the curing behaviour of the material wound onto the tool.

It will be noted that only two of the elements 134 in FIG. 7 are shown with the connectors 144 and spokes 142, but it is understood that each element 134 has a corresponding arrangement.

According to a further embodiment of the invention as shown in FIG. 8, a tool 202 has a tool surface 203 which faces radially inwards. The filament is deposited on the radially inner surface of tool elements 234. Each tool element has a connector 244 disposed on a radially outer surface having a spoke 242 extending to a support ring 250. Each of the support rings acts as an "outer hub" and may be compressed in place by an appropriate clamping arrangement.

It is within the abilities of the notional skilled person to construct a mechanism for rotating the tool 202 about a central axis A whilst depositing filament on the inner surface. It is also possible in this embodiment (or any of the preceding embodiments) for a filament deposition head to be moved (rotated about axis A) with a stationary tool.

A further embodiment may provide a unitary tool component similar in shape to the assembly of the elements 134. The unitary tool component has a number of connectors defined on the inner face, and each connector is connected to a spoke which is in turn connected to a hub as discussed in the embodiments described above.

Each connector defines a fluid chamber at least partially bounded by the inner surface of the unitary tool component. Therefore the component is divided into a number of temperature control zones. By varying the fluid temperature in each of the chambers the temperature of the corresponding (outer) tool face can be varied to influence the properties of the material deposited on the tool.

The structure of the connectors is substantially similar to the connector 14 shown in FIG. 6, that is fluid at a predetermined temperature is injected towards the inner control surface (opposite the tool face) to heat and/or cool the tool face as desired.

In a further embodiment, a tool may be provided having a tool face which faces radially inwards. The filament is deposited on the radially inner surface of unitary tool component. A plurality of connectors are disposed on a radially outer surface having a spoke extending to a support ring. Each of the support rings acts as an "outer hub" and may be compressed in place by an appropriate clamping arrangement.

Each connector defines a fluid chamber which can be used to influence the temperature of the outer control surface and hence the inner tool face.

It is also envisaged that the tools of the above embodiments may be used for the deposition of alternative forms of materials, e.g. prepregs, fibre mats etc.

As will be appreciated by the skilled person, where applicable the various features described in relation to one embodiment may equally be applied to the other embodiment.

Amendments to the design of the invention will be apparent to the skilled person and are within the scope of the invention as defined by the claims.

The invention claimed is:

1. A tool assembly for forming a product, the tool assembly comprising:
    a tool forming an endless loop in cross-section, the tool having a tool face and a control surface opposite the tool face;
    a support structure configured to support the tool proximate the control surface, the support structure comprising a plate structure defining a volume that is at least partially bounded by the control surface of the tool; and
    a plurality of independently controllable temperature control zones, each comprising a heating and/or cooling system that is configured to influence a temperature of the tool face, each heating and/or cooling system comprising a fluid heater that comprises a fluid outlet into the volume.

2. A tool assembly according to claim 1, wherein the fluid outlet is directed towards the control surface.

3. A tool assembly according to claim 1, wherein the tool comprises a plurality of tool elements and wherein the support structure is configured to support the tool proximate a periphery of the plurality of tool elements.

4. A tool assembly according to claim 3, wherein the plurality of tool elements are radially-mounted and tessellate to form a continuous tool surface.

5. A tool assembly according to claim 4, wherein the heating and/or cooling system of each of the plurality of independently controllable temperature control zones is disposed at an inner surface of a respective one of the plurality of tool elements.

6. A tool assembly according to claim 4, wherein each of the plurality of tool elements is supported by the support structure, wherein the support structure comprises a plurality of support members configured to contact discrete points around the periphery of the tool.

7. A tool assembly according to claim 1, further comprising temperature sensors configured to detect the temperature of the tool face.

8. A tool for forming a product, the tool comprising:
    a plurality of radially mounted tool elements that tessellate to form a continuous tool face, at least some of the tool elements comprising a heating and/or cooling system associated therewith to locally heat or cool the tool face, the heating and/or cooling system comprising:
        a fluid chamber at least partially bounded by the plurality of radially mounted tool elements; and
        a fluid heater having a fluid outlet into the fluid chamber such that the heating and/or cooling system is configured to influence a temperature of the tool face by heating and/or cooling the plurality of radially mounted tool elements.

9. A tool according to claim 8, wherein the tool face forms an endless loop in cross section.

10. A tool according to claim 8, mounted for rotation about a pivot axis.

11. A tool according to claim 8, further comprising temperature sensors configured to detect a temperature of the tool face.

12. A tool assembly for forming a product, the tool assembly comprising:
    a tool forming an endless loop in cross-section, the tool having a tool face and a control surface opposite the tool face;
    a plurality of radially mounted tool elements that tessellate to form a continuous tool surface, each tool element being supported by a support structure that is configured to support the tool element proximate a periphery thereof, the support structure comprising:
        a plurality of support members configured to contact discrete points around the periphery of the tool element; and
        a plate structure defining a volume at least partially bounded by a surface of the tool element; and a plurality of independently controllable temperature control zones, each comprising a heating and/or cooling system configured to influence a temperature of the tool face, each heating and/or cooling system comprising a fluid heater having an outlet into the volume at least partially bounded by a surface of the tool element.

13. A tool assembly according to claim 1, wherein each fluid heater comprises an inline air heater.

\* \* \* \* \*